(12) United States Patent
Lee et al.

(10) Patent No.: US 10,686,172 B2
(45) Date of Patent: Jun. 16, 2020

(54) BATTERY MODULE ASSEMBLY HAVING STABLE FIXING MEANS FOR UNIT MODULE

(71) Applicant: LG CHEM, LTD., Seoul (KR)

(72) Inventors: Hyoung Suk Lee, Daejeon (KR); Na Ri Shin, Daejeon (KR); Joo Sung Kim, Daejeon (KR); Hyun Chan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 192 days.

(21) Appl. No.: 15/750,997

(22) PCT Filed: Jan. 11, 2017

(86) PCT No.: PCT/KR2017/000373
§ 371 (c)(1),
(2) Date: Feb. 7, 2018

(87) PCT Pub. No.: WO2017/123003
PCT Pub. Date: Jul. 20, 2017

(65) Prior Publication Data
US 2019/0173064 A1 Jun. 6, 2019

(30) Foreign Application Priority Data
Jan. 12, 2016 (KR) .................. 10-2016-0003627

(51) Int. Cl.
*H01M 2/10* (2006.01)
*H01M 10/613* (2014.01)
(Continued)

(52) U.S. Cl.
CPC .......... *H01M 2/1077* (2013.01); *H01M 2/10* (2013.01); *H01M 2/1016* (2013.01);
(Continued)

(58) Field of Classification Search
None
See application file for complete search history.

(56) References Cited

U.S. PATENT DOCUMENTS 6,225,788 B1 5/2001 Kouzu et al.
6,344,728 B1 2/2002 Kouzu et al.
(Continued)

FOREIGN PATENT DOCUMENTS

CN 1122323 C 9/2003
CN 102270776 A 12/2011
(Continued)

OTHER PUBLICATIONS

International Search Report for PCT/KR2017/000373 (PCT/ISA/210) dated Apr. 19, 2017.
(Continued)

*Primary Examiner* — Lucas J. O'Donnell
(74) *Attorney, Agent, or Firm* — Birch, Stewart, Kolasch & Birch, LLP (57) ABSTRACT

The present invention provides a battery module assembly including: a module array body including two or more unit modules, each including a plurality of battery cells, the unit modules being arranged while sides thereof are closely attached to each other; and a combination-type module housing that includes a first space set by combining a plurality of plate members, and a second space set in the first space while a fixing bracket is additionally combined to one of the plurality of plate members.

28 Claims, 8 Drawing Sheets

(51) Int. Cl.
*H01M 10/625* (2014.01)
*H01M 10/6554* (2014.01)
*H01M 10/6567* (2014.01)

(52) U.S. Cl.
CPC ....... *H01M 10/613* (2015.04); *H01M 10/625* (2015.04); *H01M 10/6554* (2015.04); *H01M 10/6567* (2015.04); *H01M 2220/20* (2013.01)

(56) References Cited

U.S. PATENT DOCUMENTS

| | | | |
|---|---|---|---|
| 6,411,063 B1 | 6/2002 | Kouzu et al. | |
| 8,403,090 B2 | 3/2013 | Fujiwara et al. | |
| 9,499,068 B2 | 11/2016 | Yang et al. | |
| 2003/0157399 A1 | 8/2003 | Ikeuchi et al. | |
| 2005/0225283 A1 | 10/2005 | Boville | |
| 2007/0047563 A1 | 3/2007 | Shvodian | |
| 2009/0142628 A1 | 6/2009 | Okada et al. | |
| 2011/0300428 A1 | 12/2011 | Sohn | |
| 2013/0164577 A1 | 6/2013 | Insana et al. | |
| 2013/0209858 A1 | 8/2013 | Schmitt et al. | |
| 2014/0072855 A1 | 3/2014 | Schaefer | |
| 2014/0212724 A1 | 7/2014 | Lee et al. | |
| 2015/0044538 A1* | 2/2015 | Katayama | H01M 10/6556 429/120 |
| 2015/0140388 A1 | 5/2015 | Harada et al. | |
| 2015/0333304 A1* | 11/2015 | Sekine | H01M 2/1077 429/153 |
| 2016/0087319 A1 | 3/2016 | Roh et al. | |
| 2016/0134000 A1 | 5/2016 | Lee et al. | |
| 2016/0285141 A1 | 9/2016 | Sakaguchi et al. | |
| 2017/0047563 A1 | 2/2017 | Lee et al. | |
| 2019/0267676 A1 | 8/2019 | Roh et al. | |

FOREIGN PATENT DOCUMENTS

| | | |
|---|---|---|
| CN | 103931019 A | 7/2014 |
| CN | 104346122 A | 7/2014 |
| CN | 104218274 A | 12/2014 |
| CN | 105098112 A | 12/2014 |
| EP | 0964470 A1 | 12/1999 |
| EP | 2393139 A1 | 12/2011 |
| EP | 2752918 A1 | 7/2014 |
| EP | 2808920 A1 | 12/2014 |
| EP | 2808936 A1 | 12/2014 |
| EP | 2833436 A1 | 2/2015 |
| EP | 2 991 134 A1 | 3/2016 |
| JP | 2002-8608 A | 1/2002 |
| JP | 2003-297303 A | 10/2003 |
| JP | 2009-134938 A | 6/2009 |
| JP | 2012-256468 A | 12/2012 |
| JP | 2014-511552 A | 5/2014 |
| JP | 2014-191916 A | 10/2014 |
| JP | 2015-32584 A | 2/2015 |
| JP | 2015-142005 A | 8/2015 |
| KR | 10-1106308 B1 | 1/2012 |
| KR | 10-2012-0074421 A | 7/2012 |
| KR | 10-2012-0129968 A | 11/2012 |
| KR | 10-2014-0140678 A | 12/2014 |
| KR | 10-2014-0143854 A | 12/2014 |
| KR | 10-2015-0044599 A | 4/2015 |
| KR | 10-2015-0127357 A | 11/2015 |
| WO | WO 2013/171885 A1 | 11/2013 |
| WO | WO 2015/016564 A1 | 2/2015 |
| WO | WO 2015/170852 A1 | 11/2015 |
| WO | WO 2015/170920 A1 | 11/2015 |

OTHER PUBLICATIONS

Extended European Search Report, dated May 11, 2018, for European Application No. 17738632.3.

* cited by examiner

BATTERY MODULE ASSEMBLY HAVING STABLE FIXING MEANS FOR UNIT MODULE

TECHNICAL FIELD

The present application claims priority from Korean Patent Application No. 10-2016-0003627, filed on Jan. 12, 2016, the disclosure of which is hereby incorporated by reference herein in its entirety.

The present invention relates to a battery module assembly provided with stable fixing means for fixing unit modules.

BACKGROUND ART

Recently, as technology development and demand for mobile devices grow, demands for a rechargeable battery that can be charged/discharged have been rapidly increased as an energy source. Accordingly, various researches and studies with respect to a rechargeable battery that can fulfill various needs have been carried out. In addition, the rechargeable battery is also attracting attention as a power source of an electric vehicle (EV), a hybrid electric vehicle (HEV), a plug-in hybrid electric vehicle (Plug-In HEV), and the like, which have been suggested as a solution for solving air pollution caused by conventional gasoline vehicles and diesel vehicles using fossil fuels.

Thus, an electric vehicle (EV) that can be driven only by a rechargeable battery, a hybrid electric vehicle (HEV) that uses a battery and an existing engine together, and the like have been developed, and some of them have been commercially available. As a rechargeable battery of a power source of the EV, the HEV, and the like, a nickel hydrogen metal (Ni-MH) rechargeable battery has been mainly used, but, recently, a lithium rechargeable battery having high energy density, a high discharge voltage, and high output stability has been actively studied, and some are in the commercially available step.

When the rechargeable battery (or a battery cell) is used as a power source of a vehicle, the rechargeable battery is used in the form of a module having a structure in which a plurality of rechargeable batteries are connected because high power and high capacity are essential.

For example, a plurality of rechargeable batteries are electrically connected such that a single unit module is formed, and a plurality of unit cells may be manufactured as a high capacity and high output power source having an electrical connection structure by being connected in parallel, series, or a combination of parallel and series to modularize the unit modules. The structure in which the unit modules are assembled may be called a battery module in a broad sense.

Meanwhile, in order to use the battery module as a power source of, for example, a vehicle, which is a device or a system exposed to various environments, the battery module needs to maintain structural stability with respect to external impact according to various environments and needs to assure safety in various levels of humidity and temperature.

Thus, the battery module has a general structure where external members such as a case and a housing are assembled to protect the module structure and support the same, and the structure where the external members are assembled may be called a battery module assembly in a broad sense.

However, such a large-capacity battery module assembly has a significantly large volume so that a plurality of combining members, for example, extension bolts, brackets, combining bars, and the like are needed to combine the unit modules and the external members while maintaining capacity to be relatively high compared to the volume of the assembly. Accordingly, the structure becomes complicated and assembling may not be easy.

In particular, the combining members such as the extension bolts and the combining bars not only cause an increase of the number of parts for assembling, thereby increasing complexity in a manufacturing process of the battery module assembly, but also require additional space for engagement of the combining members, thereby causing an increase of the size of the space required for the battery module assembly.

Due to such factors, there is a problem with the battery module assembly in that it is difficult to have a simple structure in which constituent elements are simply combined while maintaining a small size, that is, a compact structure.

Accordingly, the need for a method for minimizing the entire volume of the assembly while having a structure in which the constituent elements are stably combined is high.

DISCLOSURE

Technical Problem

The present invention has been made to solve the above-mentioned problems of the prior art and the technical problems of the past.

Specifically, the present invention has been made to provide a battery module assembly that can stably fix unit modules and minimize the entire volume of the assembly, thereby implementing an assembly having high-capacity to volume.

Technical Solution

A battery module assembly provided to achieve such a purpose according to an exemplary embodiment of the present invention includes: a module array body including two or more unit modules, each including a plurality of battery cells, the unit modules being arranged while sides thereof are closely attached to each other; and a combination-type module housing that includes a first space set by combining a plurality of plate members, and a second space set in the first space while a fixing bracket is additionally combined to one of the plurality of plate members, wherein a module array body is mounted in the first space of the module such that the unit modules are supported by the plate members, and a part of the module array body is fixed to the module housing while being inserted into the second space.

That is, in the battery module assembly according to the present invention, the array body of the unit modules is fixed by the second space that is formed in the first space while the array body is mounted in the first space, and thus space for fixing the module array body can be saved.

More specifically, since the module array body is fixed in the first space where the module array body is substantially supported, space can be significantly saved compared to, for example, a structure in which a support space of the module array body and a fixing space for combining combination members such as extension bolts or combining bars are separated, and based on such a feature, the battery module assembly may have a significantly compact structure and at the same a space with respect to an object where the assembly is mounted can be highly utilized.

Hereinafter, a detailed structure of the battery module assembly according to the present invention will be described in further detail through non-limiting exemplary embodiments.

In one detailed example, the plurality of plate members include: a pair of end plates that support the module array body while being closely attached to opposite sides of the module array body; a lower plate that supports the module array body while being closely attached to a bottom side of the module array body; and a base plate that is disposed in a bottom side of the lower plate, and forms the first space by being mechanically combined to the end plates and the lower plate, and the unit modules respectively include protrusions formed to be inserted into the second space, and the fixing bracket may fix an alignment state of the module array body in the second space by being combined to the base plate while integrally surrounding the protrusions of the unit modules arranged in the first space.

Here, the first space is a minimum space where the module array body, which substantially has a hexahedron structure, can be mounted and supported, and implies a space set by the base plate, the lower plate, and the end plates that are formed in shapes that respectively correspond to side surfaces and the bottom surface of the module array body.

In this regard, in the present invention, it should be noted that the fixing bracket is combined to fix the module array body in the first space.

In general, the fixing bracket is a combination member for binding unit bodies such as unit modules, and a pair of fixing brackets may be engaged to fixing holes that are additionally formed in the unit bodies or engaged at an outer side of the unit bodies by additional extension bolts. However, such an engagement structure needs a space for mounting the fixing brackets, thereby increasing the entire size of the battery module assembly.

Thus, in the present invention, the fixing bracket is combined to the base plate in the first space where the module array body is mounted instead of using the above-stated additional space, so that the battery module assembly can be configured to be compact.

Hereinafter, a structure of the unit module and a combination structure in the second space will be described in detail.

Each of the unit modules may include: a front side where external input and output terminals are formed and the protrusions are formed and a rear side that faces the front side and where the protrusions are formed; a bottom side closely attached to the lower plate and a top side that faces the bottom side; and a pair of side surfaces that are formed in the same direction with respect to the end plates.

In addition, each of the unit modules may include unit cells mounted in a cell cartridge while two or more unit cells are connected in series or parallel, the cell cartridge may be combined with a plurality of case members while the unit cells are laminated such that a lamination structure of the unit cells is fixed, and a pair of engaging holes may be respectively formed to protrude from opposite ends of the cell cartridge, and thus, when the unit cells are laminated, the engaging holes of the cartridge may be disposed in parallel such that the protrusion of the unit module may be formed.

That is, the protrusion the unit module is a structure derived from the engaging holes of the unit cells, and a single protrusion is formed while the engaging holes arranged in parallel with each other in the lamination structure of the unit cells are closely attached to each other.

The cell cartridge may have a structure supporting the battery cells along external circumferential ends thereof, or a structure that supports the battery cells while being closely attached to the top side of the bottom side of the battery cell.

Electrode terminal portions of the unit cells may be exposed in a direction of the engaging holes of the cell cartridge, and accordingly, each of the unit modules may have a structure in which an electrode terminal is exposed in the protrusion direction and interconnection members that electrically connect the unit cells and include external input and output terminals are combined. Such an interconnection member may be, for example, at least one connection circuit selected from a bus bar, a battery management system (BMS), a voltage sensing member, and a temperature sensor, but this is not restrictive.

In the unit module, the front side and the rear side of the unit module, in which external input and output terminals are formed, may be sides where interconnection members are mounted.

The protrusions may be externally protruded with respect to the side surfaces of the unit module from the front side and/or the rear side while being perpendicular to the bottom side, and the fixing bracket may be provided as a pair to be respectively combined to the base plate from a front direction and a rear direction of the unit modules.

The pair of fixing brackets may be mechanically combined to the base plate while pressing the protrusions in a direction of the base plate while being closely attached to the protrusions at the front side and the rear side, and the protrusions arranged in the module array body are firmly fixed while being inserted in the second space between the fixing brackets and the base plate.

The fixing bracket may include: a downward pressing portion that presses the protrusions downwardly while being closely attached to an upper portion of the protrusions and combined to the base plate; a bent portion perpendicularly extended from an end of the downward pressing portion and that surrounds the protrusion while closely attached to a side portion of the protrusion; and a combination portion perpendicularly extended from the curved portion so as to be parallel with the base plate, and the combination portion is combined to the base plate by mechanical engaging or welding while being adjacent thereto.

Here, one side of the protrusion, pressed by the fixing bracket, has an inclined structure, and a part of an inner side of the downward pressing portion is bent to correspond to the inclination of the protrusion. When the fixing bracket fixes the protrusion, the bent portion of the downward pressing portion may additionally press the protrusion in a vertical direction with respect to the inclination while pressing the protrusion in a combination direction with respect to the base plate.

That is, the inclination structure of the fixing bracket further presses the protrusion in a direction that is opposite to the protrusion direction while being closely attached to the inclination of the protrusion to prevent the unit modules from moving in the protrusion direction of the protrusion.

The mechanical engagement may have a structure in which nuts and bolts are combined through openings formed in the fixing brackets and the base plate or a structure in which a rivet and the like is combined to the opening, and this will be described in further detail later.

Meanwhile, in one detailed example, the lower plate closely attached to the bottom side of the module array body may further include a configuration for cooling the module array body.

Specifically, the lower plate may be provided as a terminal conductive metallic plate of which the inside is formed with a hollow structure so that a liquid coolant can flows therethrough, and may include a coolant inlet hole and a coolant output hole that protrude to an outer side of the first space at one end or opposite ends thereof corresponding to the end plate.

Thus, in the battery module assembly, a coolant flowing inside the lower plate receives heat from the lower plate and discharges heat to the outside of the lower plate while heat generated from each unit module is transmitted to the lower plate such that heat dissipation of the unit modules can be carried out.

That is, since the battery module assembly according to the present invention has a structure in which a plate that supports the module array body can be cooled by itself, an additional cooling member, for example, a plurality of coolant pipes, connection members that connect the coolant pipes, water sealing members that prevent a coolant leakage may not be needed, and accordingly, a space for installation of the additional constituent elements is not needed. Accordingly, the battery module assembly according to the present invention has a very compact structure.

Such a compact structure is considerably advanced in terms of maximization of the overall size of the battery module assembly, together with the above-described features of the first and second spaces related to support and fixing of the module array body.

A metallic material forming the lower plate is not restrictive as long as it has high thermal conductivity, and for example, may be at least one selected from copper, aluminum, tin, nickel, stainless steel, a thermally conductive polymer.

The lower plate includes a coolant inlet hole and a coolant output hole that protrude to an outer side of the first space at one end or opposite ends thereof corresponding to the end plate, the hollow structure of the lower plate may have a structure in which a tube-shaped path continuously formed from the coolant inlet hole to the coolant outlet hole.

The continuously-formed tube shape may have a structure, for example, in which U-shaped or S-shaped paths are connected by the plurality of protrusions formed in the lower plate.

Such a structure can maximize a flow distance of a liquid coolant in a narrow space, and accordingly, cooling efficiency through the liquid coolant can be optimized.

In order to achieve more effective thermal conduction with the module array body, the lower plate may additionally include a thermal interface material (TIM) to promote heat conductivity at a surface closely attached to the bottom side of the module array body. Such a thermal interface material is an interface material that serves to conduct heat, and minimizes thermal resistance.

The heat conduction media may be at least one selected from a group consisting of thermally conductive grease, a thermally conductive epoxy-based adhesive, a thermally conductive silicon pad, a thermally conductive adhesive tape, and a graphite sheet, but this is not restrictive. These may be used alone or in combination of two or more.

Further, in order to prevent heat from entering a flow path from the outside except for the module array body, an insulation material such as plastic foam, heat-resistant ceramic, and the like may be additionally provided in a side that opposes the bottom side of the module array body.

In one detailed example, the base plate is a plate that forms a framework in the module housing, and may be made of a high-strength steel material to firmly combine the lower plate, the end plates, and the fixing brackets and prevent the combination structure from being deformed or damaged due to impact or external force. For example, the base plate may have a structure in which a plurality of steel sheets are combined by welding or a structure in which a plurality of sheets made of a polymer material or a metallic material are combined by welding.

The base plate may include a rigid combination structure with respect to the lower plate to reinforce mechanical rigidity of the lower plate that includes the liquid coolant.

Specifically, a plurality of through-holes are formed in an external circumferential portion of the lower plate and engaging grooves are formed in the base plate corresponding to the through-holes, and while the through-holes and the engaging grooves are disposed in parallel with each other, bolts or screws may be consecutively combined to the through-holes and the engaging grooves.

The end plate includes engaging portions that are bent in parallel with the base plate from opposite ends of the end plate to be perpendicularly combined to the base plate.

The engaging portions and the base plate may be combined by mechanical engaging or welding.

The mechanical engagement may have a structure in which nuts and bolts are combined through openings formed in the engaging portion and the base plate or a structure in which a rivet is combined to the opening.

In such a mechanical engagement, the end plates and the fixing brackets may be simultaneously combined on the base plate for simplification of the engagement structure.

Here, the simultaneous engagement implies that the combination portion of the fixing bracket is combined together with the engaging portion to the base plate while the combination portion of the fixing bracket is overlapped with the engaging portion of the end plate.

In further detail, the combination may have a structure in which screws or rivets are inserted into openings that are punched in at least two of the engaging portions, the combination portion, and the base plate while the openings are disposed to be connected with each other.

As an example, the combination portion may be combined to the base plate while being disposed on the engaging portion.

Alternatively, the engaging portion may be combined to the base plate while being disposed on the combination portion.

The end plate may further include a thermally conductive pad provided at an inner side that faces the side surface of the module array body to promote heat dissipation of the module array body, and the end plate may support the side surface while the thermally conductive pad is closely attached to the side surface of the module assembly body.

The thermally conductive pad may promote heat dissipation by reducing thermal resistance, which may occur when the side surfaces of the module array body and the end plates contact each other, and at the same time, may absorb and release external force applied to the module array body.

The thermally conductive pad may be a thermally conductive silicone material or urethane, but is not limited thereto. The thermally conductive pad may be a thermally conductive polymer paste, a rubber paste, or a silicone paste in which a thermally conductive metal powder is mixed.

Simultaneously, in the end plate, one or more openings may be formed to promote heat dissipation of the module array body. The thermally conductive pad may be exposed to the outside through the opening.

The battery module assembly according to the present invention may further include a cover member that covers a top side of the module array body while being mounted in the module housing.

Opposite ends of the cover member, corresponding to the end plates, may be perpendicularly bent so as to be closely attached to a part of external surfaces of the end plates of the module housing, and the cover member may be mechanically combined to the end plates while the bent portions are closely attached to the external surfaces of the end plates.

The mechanical combination may have a structure in which nuts and bolts are combined through openings formed in the cover member and the end plates, or a structure in which a rivet and the like is combined to the opening.

The cover member may have a structure in which input and output terminals are provided on a side that faces the side surrounding the top side of the module array body so as to be electrically connected with a device or another battery module assembly, and the input and output terminals may externally protrude.

In this regard, in the cover member, a circuit electrically connected to input/output terminals protruding outwardly may be formed on the inner surface facing the module array body, and may be electrically connected to the external input/output terminals of the unit modules.

The type of the battery cell forming the battery module assembly according to the present invention is not particularly limited, but a specific example thereof is a lithium ion battery having advantages of high energy density and discharge voltage.

In general, a lithium secondary battery is formed of a positive electrode, a negative electrode, a separator, and a non-aqueous electrolyte containing a lithium salt.

The positive electrode is prepared, for example, by coating a mixture of a positive electrode active material, a conductive material, and a binder on a positive electrode current collector, and then drying the resultant. Alternatively, a filler may be further added to the mixture.

The positive active material may be a layered compound such as a lithium cobalt oxide ($LiCoO_2$), a lithium nickel oxide ($LiNiO_2$), and the like, or a compound substituted with one or more transition metals; a lithium manganese oxide such as $LiMnO_3$, $LiMn_2O_3$, and $LiMnO_2$ represented by a chemical formula $Li_{1+x}Mn_{2-x}O_4$ (where x is 0 to 0.33); a lithium copper oxide ($Li_2CuO_2$); a vanadium oxide such as $LiV_3O_8$, $LiFe_3O_4$, $V_2O_5$, $Cu_2V_2O_7$, and the like; a Ni-site lithium nickel oxide represented by a chemical formula $LiNi_{1-x}M_xO_2$ (where, M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta and x=0.01 to 0.1) or $Li_2Mn_3MO_8$ (where M=Fe, Co, Ni, Cu, or Zn); $LiMn_2O_4$ in which a part of Li in the formula is substituted with an alkaline earth metal ion; a disulfide compound; $Fe_2(MoO_4)_3$, and the like, but this is not restrictive.

The conductive material is usually added in an amount of 1% to 30% by weight based on the total weight of the mixture including the cathode active material. Such a conductive material is not particularly limited as long as it has electrical conductivity and does not cause a chemical change in the battery, and examples thereof include graphite such as natural graphite and artificial graphite; carbon compounds such as carbon black, acetylene black, Ketjen black, channel black, furnace black, lamp black, and summer black; conductive fibers such as carbon fiber and metal fiber; metal powders such as carbon fluoride, aluminum, and nickel powders; conductive whiskey such as zinc oxide and potassium titanate; conductive metal oxides such as titanium oxide; conductive materials such as polyphenylene derivatives; and the like can be used.

The binder is a component that assists in bonding between the active material and the conductive material and bonding to the current collector, and is typically added in an amount of 1 wt % to 30 wt % based on the total weight of the mixture containing the cathode active material. Examples of such binders include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, and the like.

The filler is selectively used as a component for suppressing expansion of the positive electrode, and is not particularly limited as long as it is a fibrous material that does not cause a chemical change in the battery. Examples of the filler include olefin polymers such as polyethylene and polypropylene, fibrous materials such as glass fiber, carbon fiber, and the like.

The negative electrode is manufactured by applying and drying a negative active material on a negative current collector, and as necessary, the above-described components may be selectively further included.

Examples of the negative electrode active material include carbon such as non-graphitized carbon and graphite carbon; Al, B, P, Si, elements of Group 1 of the periodic table, $Li_xFe_2O_3$ (0≤X≤1), $Li_xWO_2$ (0≤X≤1), $Sn_xMe_{1-x}Me'_yO_z$ (Me: Mn, Fe, Pb, Ge, Me', Al, B, P, Si, elements of Groups 1, 2, and 3 of the periodic table, or a halogen; 0<x≤1; 1≤y≤3; 1≤z≤8); a metal complex oxide; lithium metal; a lithium alloy; a silicon-based alloy; a tin-based alloy; a metal oxide such SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; ILi—Co—Ni-based materials; and the like.

The separator and the separation film are interposed between the positive electrode and the negative electrode, and an insulating thin film having high ion permeability and mechanical strength is used. A pore diameter of the separator is about 0.01 to 10 μm, and the thickness is about 5 to 300 μm. As the separator, for example, olefinic polymers such as polypropylene, which is chemically resistant and hydrophobic, or a sheet or a nonwoven fabric made of glass fiber, polyethylene, or the like, is used. When a solid electrolyte such as a polymer is used as an electrolyte, the solid electrolyte may also serve as a separator.

In addition, in one specific example, in order to improve safety of a battery having high energy density, the separator and/or the separation film may be an organic/inorganic complex porous safety-reinforcing separator (SRS).

The SRS is manufactured by using inorganic particles and a binder polymer on the polyolefin-based separator substrate as an active layer component. In addition to the pore structure contained in the separator substrate itself, the separator has a structure in which pores are uniformly formed by interstitial volume between the inorganic particles.

When the organic/inorganic composite porous separator is used, compared to a case of using a typical separator, an increase of a battery thickness due to swelling in formation can be suppressed, and when a polymer that can be gelable when being impregnated in a liquid electrolyte is used as a binder polymer component, it can also be used as an electrolyte.

In addition, the organic/inorganic composite porous separator can exhibit excellent adhesion characteristics by controlling the contents of the inorganic particles and the binder polymer, which are the active layer components in the separator, so that the battery assembly process can be easily performed.

The inorganic particles are not particularly limited as long as they are electrochemically stable. That is, the inorganic particles that can be used in the present invention are not particularly limited as long as an oxidation and/or reduction reaction does not occur in an operating voltage range of the applied battery (for example, 0 to 5 V based on Li/Li+). Particularly, when inorganic particles having ion-transferring ability are used, ion conductivity in an electrochemical device can be increased to thereby improve performance, and accordingly, the ionic conductivity is preferably as high as possible. When the inorganic particles have high density, it is difficult to disperse the inorganic particles at the time of coating, and the weight is also increased in the production of a battery, such that it is preferable that the density is as small as possible. In the case of an inorganic substance having a high dielectric constant, a degree of dissociation of an electrolyte salt in a liquid electrolyte, for example, a lithium salt, can be increased so that ionic conductivity of the electrolytic solution can be improved.

The nonaqueous electrolytic solution containing a lithium salt is formed of a polar organic electrolytic solution and a lithium salt. As the electrolytic solution, a non-aqueous liquid electrolyte, an organic solid electrolyte, an inorganic solid electrolyte, and the like are used. As examples of the nonaqueous liquid electrolytic solution, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, a propylene carbonate derivative, a tetrahydrofuran derivative, ether, methyl pyrophosphate, ethyl propionate, and the like can be used.

As examples of the organic solid electrolyte, for example, a polymer including a polyethylene derivative, a polyethylene oxide derivative, a polypropylene oxide derivative, a phosphate ester polymer, a polyagitation lysine, a polyester sulfide, a polyvinyl alcohol, a polyvinylidene fluoride, polymers containing ionic dissociation groups, and the like may be used.

As the inorganic solid electrolyte, for example, nitrides of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like, halides, sulfates, and the like may be used.

The lithium salt is a substance which is soluble in the non-aqueous electrolyte, and for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lower aliphatic carbonic acid lithium, 4 phenyl boric acid lithium, imide, and the like may be used.

In addition, for the purpose of improving the charge-discharge characteristics and the flame retardancy, non-aqueous liquid electrolytes include, for example, pyridine, triethylphosphite, triethanolamine, cyclic ether, ethylenediamine, n-glyme, hexaphosphoric triamide, benzene derivatives, sulfur, quinone imine dyes, N-substituted oxazolidinones, N, N-substituted imidazolidines, ethylene glycol dialkyl ethers, ammonium salts, pyrrole, 2-methoxyethanol, aluminum trichloride, and the like may be added. In some cases, a halogen-containing solvent such as carbon tetrachloride or ethylene trifluoride may be further added to impart inflammability, or carbon dioxide gas may be further added to improve high-temperature storage characteristics.

The present invention also provides a battery pack including at least one of the battery module assemblies.

The battery pack may include: a pack housing with a mounting portion having an inwardly concave shape such that the battery module assembly is mounted therein; and a cooling system that cools the battery module assembly by supplying a liquid coolant to a lower plate of the battery module assembly.

The present invention also provides a device including the battery pack, and the device may be one selected from a group consisting of an electric vehicle, a hybrid electric vehicle, and a plug-in hybrid electric vehicle.

The above-described devices are well known in the art, and therefore a detailed description thereof will be omitted herein.

MODE FOR INVENTION

Hereinafter, an exemplary embodiment of the present invention is described with reference to the drawings, and is provided for easy understanding of the present invention, but the scope of the present invention is not limited thereto.

Figure 1:
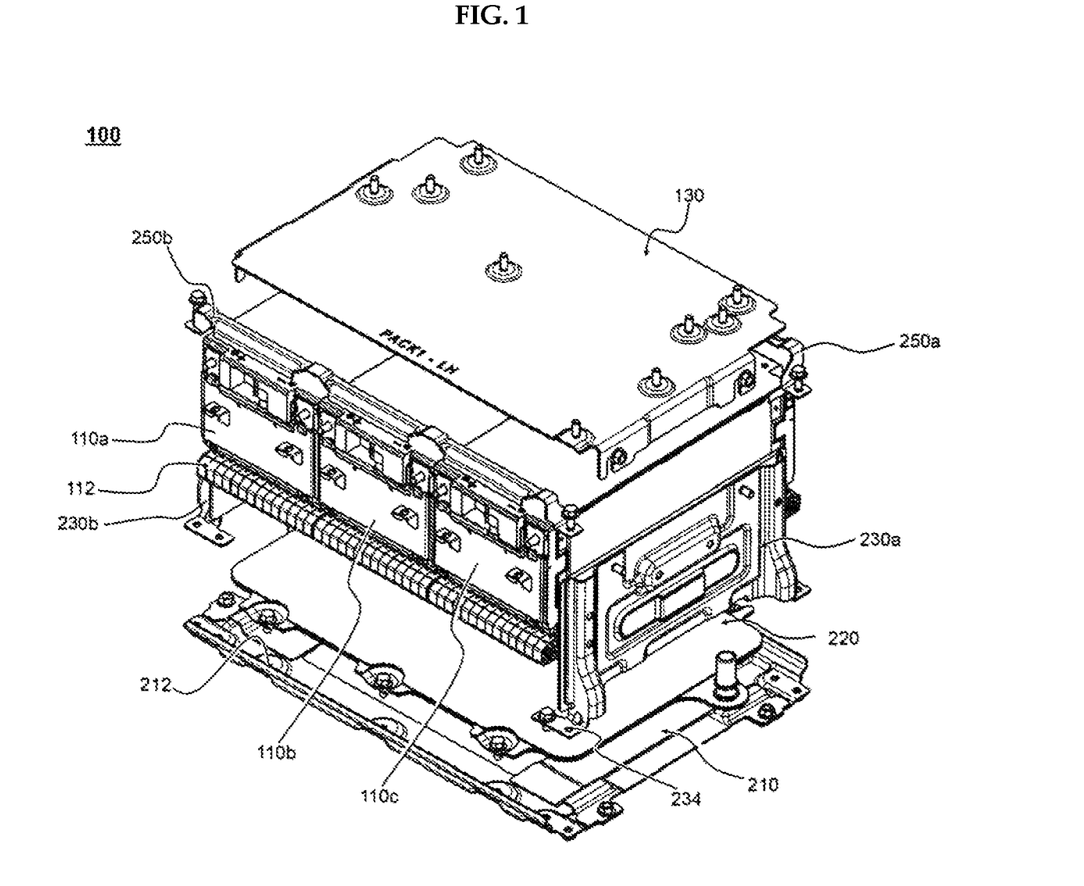
FIG. 1 is an exploded perspective view of a battery module assembly according to an exemplary embodiment the present invention.
Figure 2:
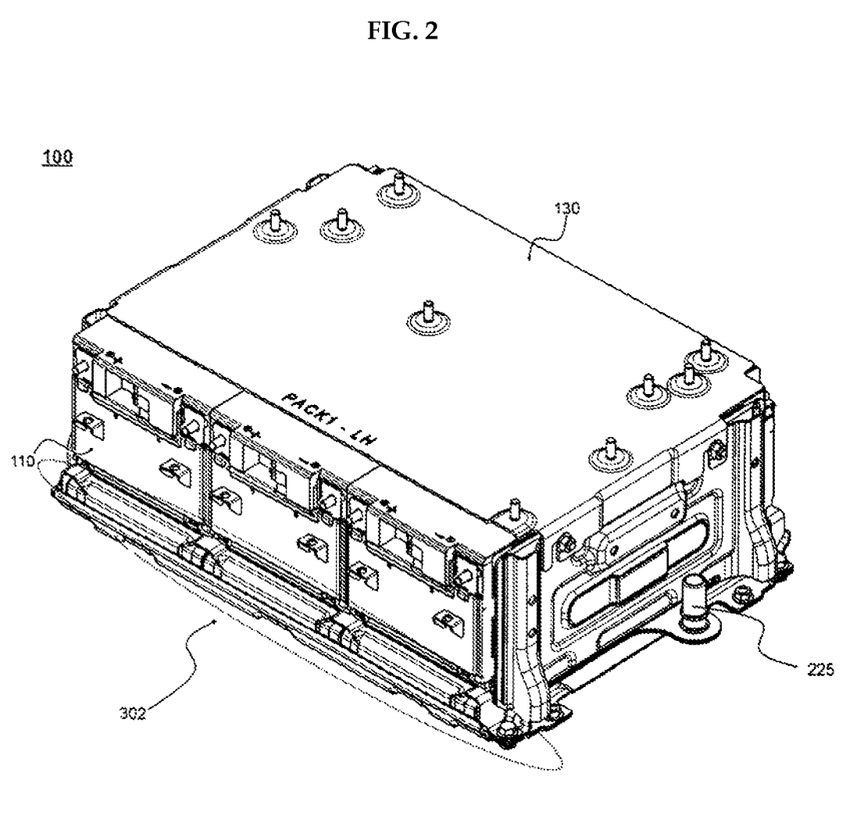
FIG. 2 is a schematic view of the battery module assembly of FIG. 1.
Figure 3:
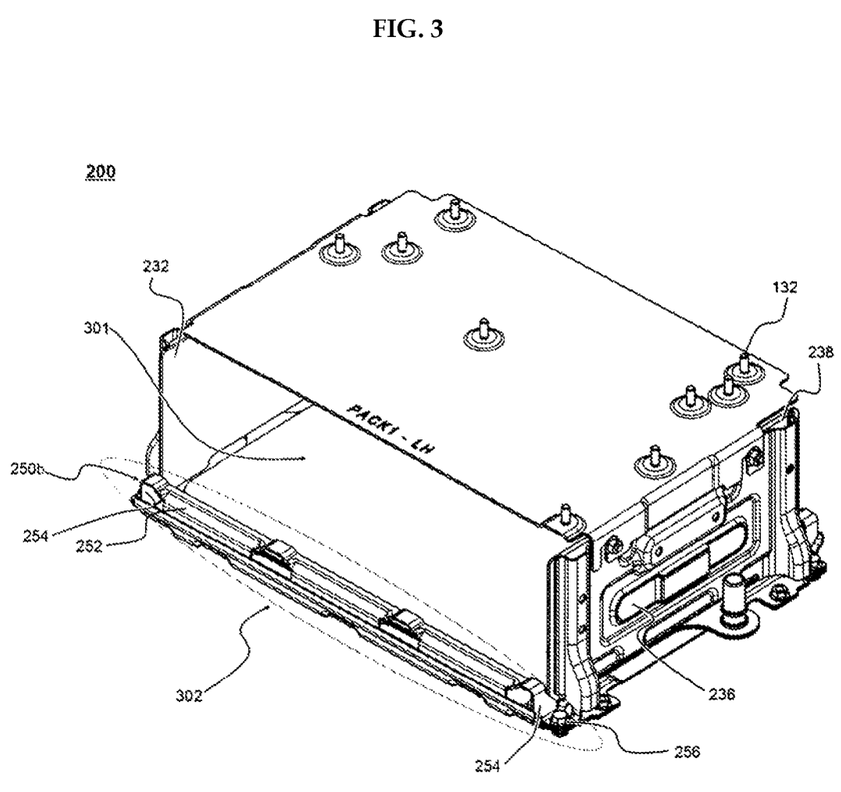
FIG. 3 is a schematic view of a combination-type module housing according to the exemplary embodiment of the present invention.

FIG. 1 is an exploded perspective view of a battery module assembly according to an exemplary embodiment of the present invention, and FIG. 2 is a schematic view of the battery module assembly of FIG. 1. In FIG. 3, a combination type of modeling housing according to the exemplary embodiment of the present invention is illustrated.

Referring to the drawings, a battery module assembly 100 includes a module array body 110 where three unit modules 110a, 110b, and 110c are arranged while side surfaces of each of the unit modules 110a, 110b, and 110c are in close contact with each other, and includes a protrusion 112 that protrudes perpendicularly to an alignment direction of the unit modules 110a, 110b, and 110c, a module housing 200 that fixes the module array body 110 while supporting the same, and a cover member 130 that surrounds a top surface of the module array body 110 while being mounted in the module housing 200.

The module housing 200 has a structure in which a plurality of plate members 210, 220, 230a, and 230b are combined, and includes a pair of end plates 230a and 230b, a lower plate 220, and a base plate 210, and further includes a pair of fixing brackets 250a and 250b. In the present exemplary embodiment, the structure including the plate members 210, 220, 230a, and 230b is called a combination type of module housing 200.

Such a combination structure of the module housing 200 is formed by combining the end plates 230a and 230b, the lower plate 220, and the fixing brackets 250a and 250b to the base plate 210, which forms a framework of the module housing 200.

Specifically, a plurality of through-holes 229 (refer to FIG. 5) are formed around an external circumference of the lower plate 220, engaging grooves 212 are formed corresponding to the through-holes 229 in the base plate 210, and screws are respectively combined to the through-holes 229 and the engaging grooves 212 such that the lower plate 220 and the base plate 210 are combined with each other.

The end plates 230a and 230b include engaging portions 234 that are bent in parallel with the base plate 210 at opposite ends of each of the end plates 230a and 230b such that the end plates 230a and 230b can be perpendicularly combined to the base plate 210, and the engaging portions 234 are combined to the base plate 210 by nuts and bolts while being adjacent to each other at opposite ends of the base plate 210.

As described, a space formed through the combination of the plate members 210, 220, 230a, and 230b is defined as a first space 301 where unit modules are mounted and supported, and specifically, the first space 301 is a minimum space where the module array body 110, which has a substantially hexahedron structure, can be mounted and supported. The first space 301 implies a space set by the base plate 210, the lower plate 220, and the end plates 230a and 230b that are formed in shapes that respectively correspond to side surfaces and the bottom surface of the module array body 110.

The module housing 200 further includes the fixing brackets 250a and 250b, and the fixing brackets 250a and 250b are respectively combined to a front end and a rear end of the base plate 210 such that a second space 302, which is another space set by the fixing brackets 250a and 250b and the base plate 210, is formed in the first space 301.

Particularly, the second space 302 is relatively smaller than the first space 301, and in the battery module assembly 100 according to the exemplary embodiment of the present invention, the protrusion 112, which is a part of the module assembly body 110, is inserted into the second space 302 such that the module array body 110 is entirely fixed while the module array body 110 is mounted in the first space 301.

In addition, in the battery module assembly 100 according to the exemplary embodiment of the present invention, the cover member 130 further surrounds the module array body 110 such that the module array body 110 can be more firmly fixed in the first space 310.

Specifically, the cover member 130 is a member that surrounds the top side of the module array body 110 mounted in the module housing 200, and is formed with a structure in which opposite ends of the cover member 130, corresponding to the end plates 230a and 230b, are perpendicularly bent so as to be closely attached to a part of the exterior surface of the end plates 230a and 230b of the module housing 200.

As described, the bent portions are engaged with the end plates 230a and 230b by nuts and bolts while being closely attached to the exterior surface of the end plates 230a and 230b such that the cover member 130 becomes integrated with the module housing 200. A plurality of input and output terminals are formed in an external side of the cover member 130.

Figure 4:
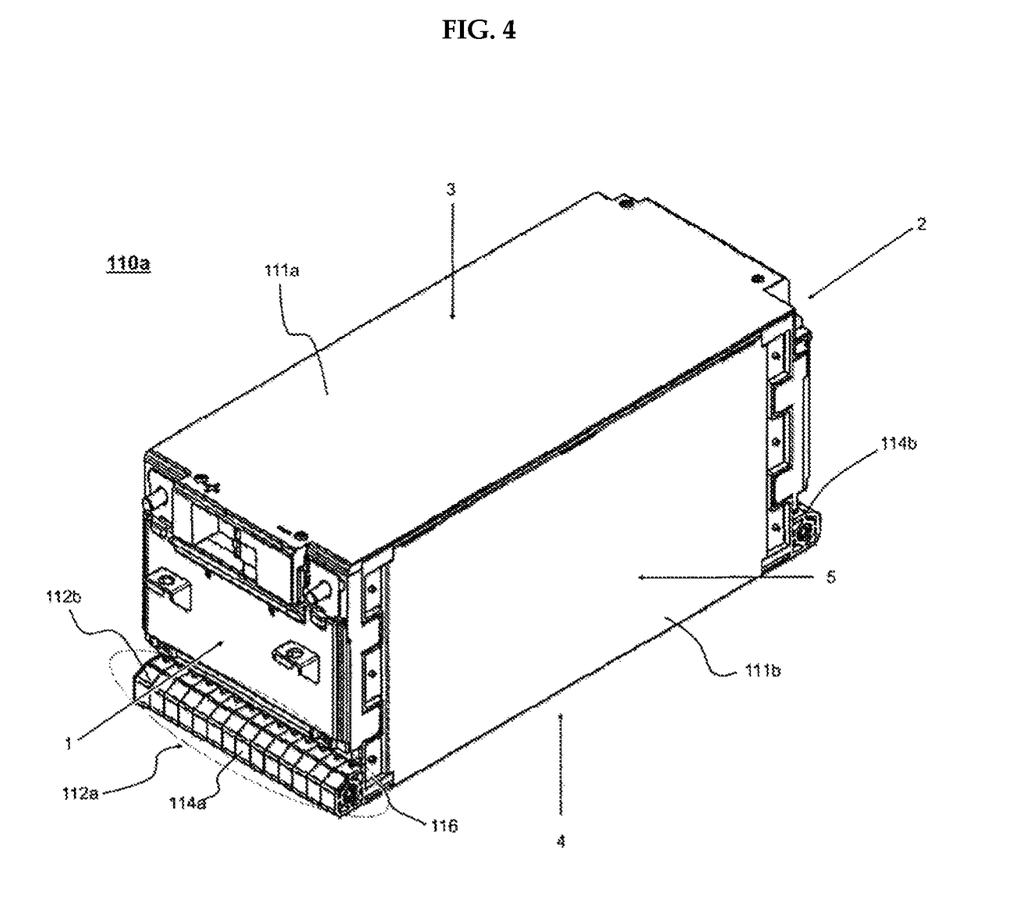
FIG. 4 is a schematic view of a unit module according to the exemplary embodiment of the present invention.

FIG. 4 schematic illustrates the unit module according to the exemplary embodiment of the present invention, and a structure of the battery module assembly will be described in further detail with reference to FIG. 1 to FIG. 3.

Referring to the drawings, the unit module 110a is formed as a substantially hexahedral structure including a front side 1, a rear side 2, a bottom side 4, a top side 3, and a pair of side surfaces 5. The hexahedral structure of FIG. 4 is the same as the structures of the unit modules 110b and 110b of FIG. 1 to FIG. 3.

In the front side 1, external input and output terminals are formed for electrical connection of the unit module 110a, and a protrusion 112a protruded from the front side 1 is additionally provided. The protrusion 112a is also provided in the rear side 2, which is the opposing side of the front side 1, with the same structure. The bottom side 4 is closely attached to the lower plate 220, and the top side 3, which is the opposing side of the bottom side 4, is closely attached to the cover member 130. The pair of side surfaces 5 are closely attached to side surfaces of the end plate or another battery module.

The protrusion 112a externally protrudes from the top side 1 and the rear side of the unit module 110a respect to the side surfaces 5 of the unit module 110a, and the protruded shape is perpendicular to the bottom side 4.

The unit module 110a includes unit cells (not shown), each formed of two or more battery cells (not shown), that are embedded in a cell cartridge 116 while being connected in series or parallel, and the cell cartridge 116 in which unit cells are laminated is combined to a plurality of case members 111a and 111b such that the lamination structure of the unit cells is fixed.

Here, a pair of engaging holes 114a and 114b that protrude outwardly are provided at opposite ends of the cell cartridge 116, and in lamination of the unit cells, the engaging holes 114a and 114b of the cartridges 116 are disposed parallel with each other (refer to reference numeral 4 in FIG. 4) such that the protrusion 112a of the unit module is formed.

That is, the protrusion 112a of the unit module is a structure derived from the engaging holes 114a and 114b of the unit cells, and a single protrusion 112a is formed while the engaging holes 114a and 114b arranged in parallel with each other in the lamination structure of the unit cells are closely attached to each other.

Similarly, the unit modules 110a, 110b, and 110c are arranged as a single module array body 110, and protrusions 112a of each of the unit modules 110a, 110b, and 110c are disposed parallel with each other such that a pair of protrusions 112 are respectively formed at a front and a rear of the module array body 110.

As described, while the protrusions 112 of the module array body 110 are inserted in the second space 302, the entire module array body 110 can be fixed to the module housing 200.

That is, in the battery module assembly 100 according to the present exemplary embodiment, the array body 110 of the unit modules 110a, 110b, and 110c is fixed by the second space 302 that is formed in the first space 301 while the array body 110 is mounted in the first space 301, and thus space for fixing the module array body 110 can be saved.

Referring back to FIG. 1 to FIG. 3, the fixing brackets 250a and 250b that set the second space 302 are mechanically combined to the base plate 210 while pressing the protrusions 112 in a direction of the base plate 210 while being closely attached to the protrusions 112 provided at the front side 1 and the rear side 2, and the fixing brackets 250a and 250b can be rigidly fixed in the second space 302 while the protrusions 112 of the module array body 110 are closely attached to the base plate 210 by the pressure force of the fixing brackets 250a and 250b.

The fixing brackets 250a and 250b include a downward pressing portion 252, a bent portion 254, and a combination portion 256. The downward pressing portion 252 downwardly presses the protrusion 112 while being closely attached to an upper portion of the protrusion 112 and thus combined to the base plate 210, the curved portion 254 perpendicularly extends from an end of the downward pressing portion 252, and the combination portion 256 perpendicularly extends from the bent portion 254 so as to be parallel with the base plate 210.

The combination portion 256 is combined with a structure where nuts and bolts are combined through openings formed in the fixing brackets 250a and 250b and the base plate 210 while being disposed adjacent to the base plate 210.

Here, the combination portions 256 of the fixing brackets 250a and 250b are overlapped with the engaging portions 234 of the end plates 230a and 230b, but while one of openings formed in the engaging portion 234, an opening formed in the combination portion 256, and one of openings formed in the base plate 210 are located to be connected with each other, bolts are consecutively inserted into the openings and then combined with nuts such that the fixing brackets 250a and 250b can be combined to the base plate 210.

This is the structure shown in FIG. 1, and in this structure, two openings are formed in the engaging portions 234 of the end plates 230a and 230b, and one of the two openings is combined only to the base plate 210 by a screw and the other is combined to the base plate 210 together with the fixing brackets 250a and 250b by screws.

Thus, the end plates 230a and 230b are double-combined so that they can be rigidly fixed to the base plate 201.

Figure 8:
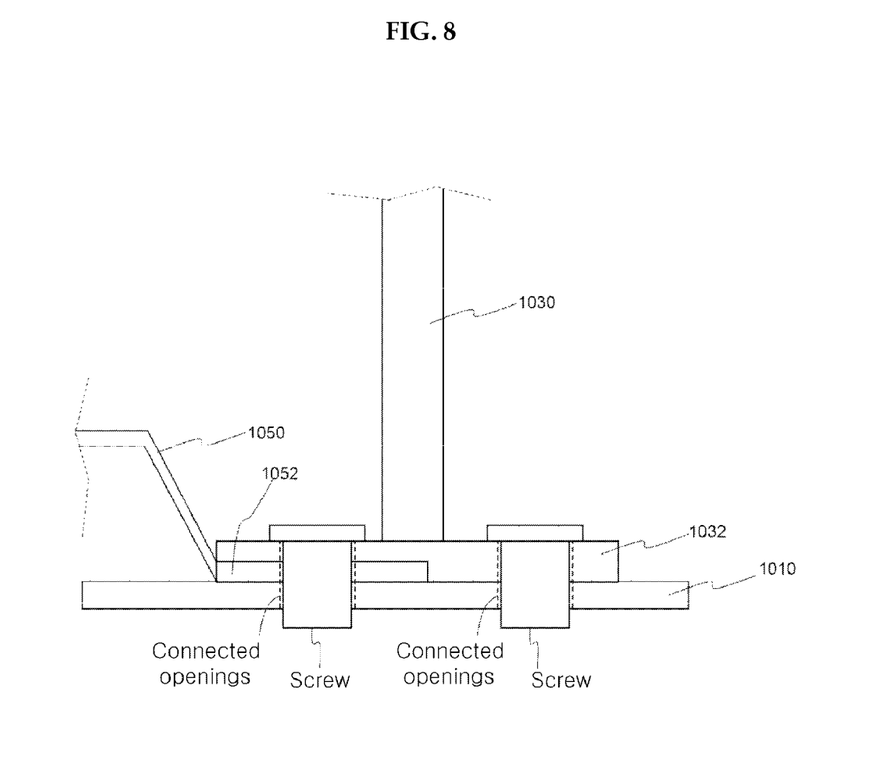
FIG. 8 is a schematic view of a combination structure of a fixing bracket and an end plate according to another exemplary embodiment of the present invention.

Alternatively, as shown in FIG. 8, an end plate 1030 may be combined to a base plate 1010 while an engaging portion 1032 of the end plate 1030 is disposed on a combination portion 1052 of a fixing bracket 1050.

Specifically, the engaging portion 1032 of the end plate 1030 is overlapped with the combination portion 1052 of the fixing bracket 1050, but, while one of openings formed on the engaging portion 1032, an opening formed in the combination portion 1052, and one of openings formed in the base plate 1010 are located to be connected with each other, bolts are consecutively inserted into the openings and then combined with nuts such that the fixing bracket 1050 can be combined between the end plate 1030 and the base plate 1010. Other openings formed in the engaging portion 1032 of the end plate 1030 are combined only to the base plate 1010.

Such a structure has an advantage that the fixing bracket 1050 can firmly fix unit modules.

Meanwhile, one side the protrusion 112a of the unit module 110a, pressed by the fixing brackets 250a and 250b, has an inclined structure (inclination 112b of FIG. 4), and the inclination 112b is formed along a protrusion direction of the protrusion 112a.

Corresponding to the protrusion 112a, a part of interior surfaces of the fixing brackets 250a and 250b, that is, an interior surface of the downward pressing portion 252, is bent to correspond to the inclination 112b.

Such a structure prevents the unit module 110a from moving along a protrusion direction of the protrusion 112a by further pressing the protrusion 112a in a direction that is opposite to the protrusion direction of the protrusion 112a while the inclinations 112b are in contact with the fixing brackets 250a and 250b. The other unit modules 110b and 110c also have the same structure.

Figure 5:
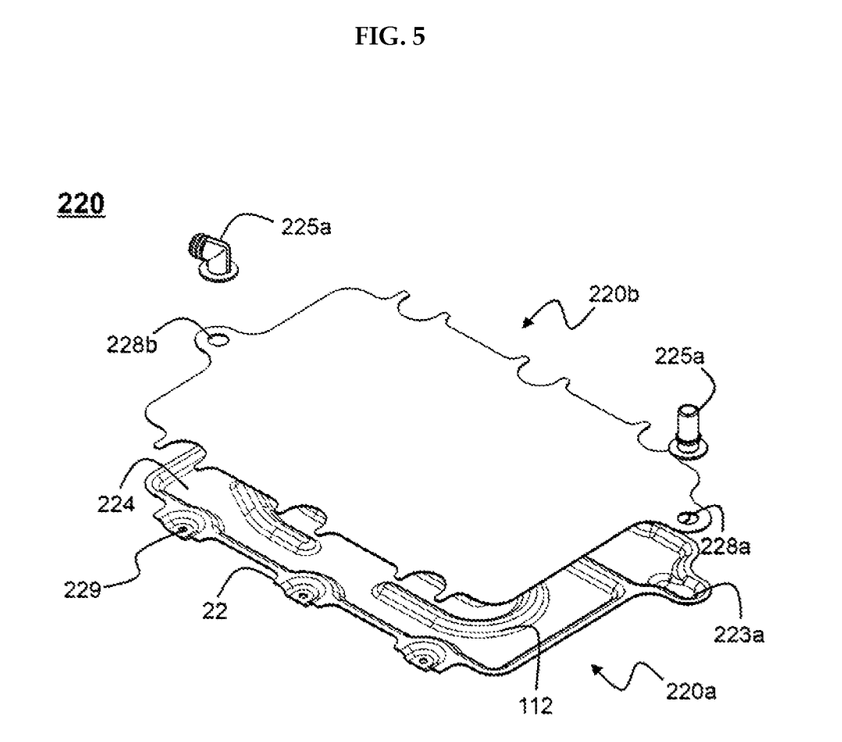
FIG. 5 and FIG. 6 are schematic views of a lower plate.
Figure 6:
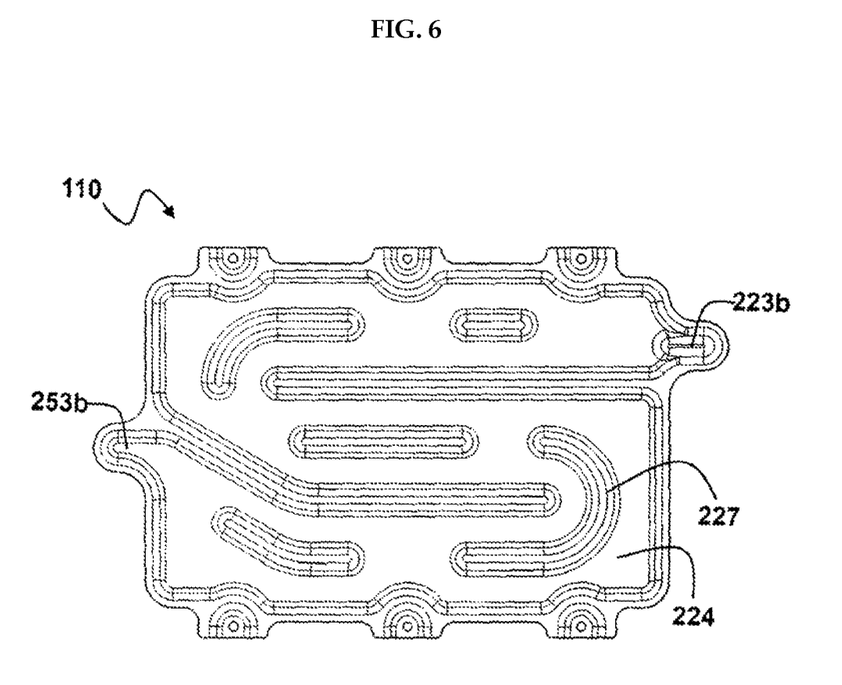

Meanwhile, in the present exemplary embodiment, the module housing 200 has a structure that can heat and cool the module array body 110, and this structure will be described in detail with reference to FIG. 5 and FIG. 6, together with FIG. 1 to FIG. 3.

Referring to the drawings, the lower plate 220 is formed of a thermally conductive metallic plate of which the inside has a hollow structure such that a liquid coolant can flow therethrough, and specifically, the lower plate 220 includes a first plate 220a and a second plate 220b, and the first plate 220a and the second plate 220b are combined with each other, thereby forming the following structure therebetween.

In the first plate 220a, a concave portion 224 that is concave from one side in a direction that is opposite to the one side is formed, and a coolant inlet channel 223a and a coolant outlet channel 223b are formed at opposite external sides. The coolant inlet channel 223a and the coolant outlet channel 223b are connected with the concave portion 224. The coolant inlet and outlet channels 223a and 223b are disposed at outer sides of the first space 301, adjacent to the end plates 230a and 230b.

The second plate 220b covers the concave portion 224 of the first plate 220a to isolate the concave portion 224 from the outside, and specifically, the second plate 220b has a structure that has a size and a shape corresponding to the size and the shape of the concave portion 224, excluding a plurality of through-holes 229 formed at an external circumferential portion 22 of the first plate 220a on a plane.

In addition, among exterior circumferential sides of the second plate 220b, portions corresponding to the channels 223a and 223b of the first plate 220a protrude outside, and openings 228a and 228b are formed by being punched in the protruded portions such that a coolant inlet hole 225a and a coolant outlet hole 225b are combined with the openings 228a and 228b for connection with a coolant pipe. The coolant inlet hole 225a and the coolant outlet hole 225b are disposed in the external direction of the first space 301, adjacent to the end plates 230a and 230b in the module housing 200.

A plurality of protrusions 227 are provided protruding in a direction where the second plate 220b is disposed in the concave portion 224 of the first plate 220a to divide flow of the liquid coolant from the coolant inlet hole 225a to the coolant outlet hole 225b and at the same maximize the flow distance.

Thus, when the first plate 220a and the second plate 220b are combined, the protrusions 227 are closely attached to one side of the second plate 220b such that a hollow flow path through which the liquid coolant flows is formed and thus the liquid coolant flows along the path while being guided by the protrusions 227.

In particular, in the present exemplary embodiment, the protrusions 227 formed in the first plate 220a respectively have different shapes, and accordingly, the liquid coolant is irregularly divided through the protrusions 227, thereby causing generation of a vortex such that the liquid coolant spreads more rapidly due to the vortex, thereby increasing cooling efficiency of the lower plate 220.

Meanwhile, the end plates include a structure for heat dissipation of the module array body, and this will be described in detail with reference to FIG. 1 to FIG. 3.

In each of the end plates 230a and 230b, a thermally conductive pad 232 is added to an interior side that faces the side surface of the module array body 110 to promote heat dissipation of the module array body 110, and the end plates 230a and 230b support the side surfaces of the module array body 110 while the thermally conductive pads 232 are closely attached to the side surfaces of the module array body 110.

The thermally conductive pad 232 promotes heat dissipation by reducing thermal resistance, which may occur when the side surfaces of the module array body 110 and the end plates 230a and 230b contact each other, and at the same time, absorbs and releases external force applied to the module array body 110.

Further, openings 236 and heat dissipation ducts 238 are formed in the end plates 230a and 230b.

Such a structure can further promote heat dissipation of the thermally conductive pad 232 exposed through the opening 236, and high-temperature air may be discharged or low-temperature air is taken in via the heat dissipation duct 238 so that heat dissipation through the thermally conductive pad 232 can be optimized.

Figure 7:
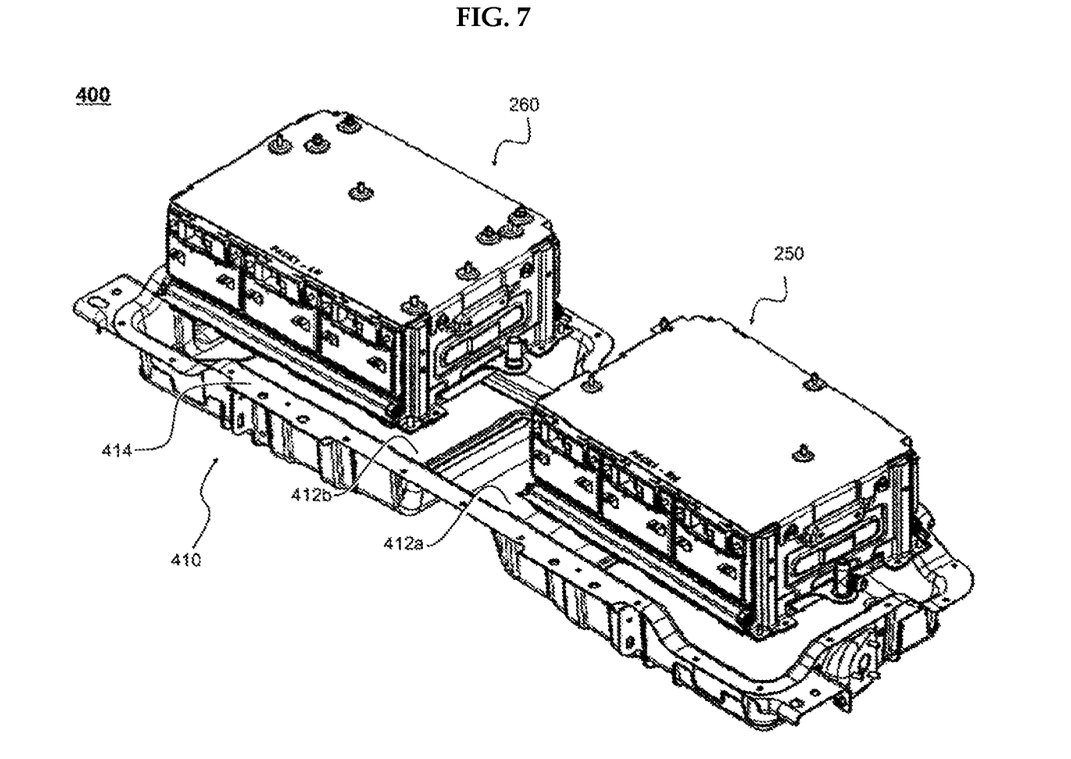
FIG. 7 is a schematic view of a battery pack according to the exemplary embodiment of the present invention.

FIG. 7 is a schematic view of a battery pack according to the exemplary embodiment of the present invention.

Referring to FIG. 7, a battery pack 400 includes a pair of battery module assemblies 250 and 260, a pack housing 410, and a cooling system (not shown) that cools the battery module assemblies 250 and 260 by supplying or receiving a liquid coolant to or from lower plates of the battery module assemblies 250 and 260.

Here, the pack housing 410 may include mounting portions 412a and 412b that are concave inwardly to mount the battery module assemblies 250 and 260 therein, and the battery module assemblies 250 and 260 can be fixed by mechanical engaging members while being mounted in the mounting portions 412a and 412b.

Engaging means formed at external circumferential sides 414 of the pack housing 410 are engaged to a lower side of a vehicle such that the battery pack 400 according the present exemplary embodiment can be used as a power source of the vehicle.

INDUSTRIAL AVAILABILITY

As described above, the battery module assembly according to the present invention has a structure in which the module array body is supported and fixed in the first space, and therefore, space can be significantly saved compared to, for example, a structure in which a support space of the module array body and a fixing space for combining combination members such as extension bolts or combining bars are separated, and based on such a feature, the battery module assembly may have a significantly compact structure and at the same space with respect to an object where the assembly is mounted can be highly utilized.

The invention claimed is:

1. A battery module assembly comprising:
a module array body including two or more unit modules, each including a plurality of battery cells, the unit modules being arranged while sides thereof are closely attached to each other; and
a combination-type module housing that includes a first space set by combining a plurality of plate members, and a second space set in the first space while a fixing bracket is additionally combined to one of the plurality of plate members,
wherein the module array body is mounted in the first space of the module such that the unit modules are supported by the plate members, and a part of the module array body is fixed to the module housing while being inserted into the second space, and
wherein the plurality of plate members comprises:
a pair of end plates that support the module array body while being closely attached to opposite sides of the module array body;
a lower plate that supports the module array body while being closely attached to a bottom side of the module array body; and
a base plate that is disposed at a bottom side of the lower plate, and forms the first space by being mechanically combined to the end plates and the lower plate.

2. The battery module assembly of claim 1, wherein
the unit modules respectively comprise protrusions formed to be inserted into the second space, and
the fixing bracket fixes an alignment state of the module array body in the second space by being combined to the base plate while integrally surrounding the protrusions of the unit modules arranged in the first space.

3. The battery module assembly of claim 2, wherein each of the unit modules comprises:
a front side where external input and output terminals are formed and the protrusions are formed, and a rear side that faces the front side and where the protrusions are formed;
a bottom side closely attached to the lower plate and a top side that faces the bottom side; and
a pair of side surfaces that are formed in the same direction with respect to the end plates.

4. The battery module assembly of claim 3, wherein the protrusion is externally protruded with respect to the side surfaces of the unit module from the front side and the rear side while being perpendicular to the bottom side, and the fixing bracket is provided as a pair to be respectively combined to the base plate from a front direction and a rear direction of the unit modules.

5. The battery module assembly of claim 4, wherein the pair of fixing brackets are mechanically combined to the base plate while pressing the protrusions in a direction of the base plate while being closely attached to the protrusions at the front side and the rear side.

6. The battery module assembly of claim 4, wherein the fixing bracket comprises:
a downward pressing portion that presses the protrusions downwardly while being closely attached to an upper portion of the protrusions and combined to the base plate;
a bent portion perpendicularly extended from an end of the downward pressing portion and that surrounds the protrusion while being closely attached to a side portion of the protrusion; and
a combination portion perpendicularly extended from the curved portion so as to be parallel with the base plate, and
the combination portion is combined to the base plate by mechanical engaging or welding while being adjacent thereto.

7. The battery module assembly of claim 4, wherein one side of the protrusion, pressed by the fixing bracket, has an inclined structure, a part of an inner side of the downward pressing portion is bent to correspond to the inclination of the protrusion, and when the fixing bracket fixes the protrusion, the bent portion of the downward pressing portion additionally presses the protrusion in a vertical direction with respect to the inclination while pressing the protrusion in a combination direction with respect to the base plate.

8. The battery module assembly of claim 3, wherein each of the unit modules comprises unit cells mounted in a cell cartridge while two or more unit cells are connected in series or parallel, the cell cartridge is combined with a plurality of case members while the unit cells are laminated such that a lamination structure of the unit cells is fixed, and a pair of engaging holes are respectively formed to protrude from opposite ends of the cell cartridge, and thus, when the unit cells are laminated, the engaging holes of the cartridge are disposed in parallel such that the protrusion of the unit module is formed.

9. The battery module assembly of claim 2, wherein a plurality of through-holes are formed at a circumferential portion of the lower plate, and engaging grooves are formed in the base plate corresponding to the through-holes, and while the through-holes and the engaging grooves are disposed in parallel with each other, bolts or screws are consecutively combined to the through-holes and the engaging grooves.

10. The battery module assembly of claim 2, wherein the end plate comprises engaging portions that are bent in parallel with the base plate from opposite ends of the end plate to be perpendicularly combined to the base plate, and the engaging portions and the base plate are combined by mechanical engaging or welding.

11. The battery module assembly of claim 2, wherein the lower plate is a terminal conductive metallic plate of which the inside is formed with a hollow structure so that a liquid coolant can flow therethrough.

12. The battery module assembly of claim 11, wherein the lower plate additionally includes a thermal interface material to promote heat conductivity at a surface closely attached to the bottom side of the module array body.

13. The battery module assembly of claim 12, wherein the thermal interface material is at least one selected from a group consisting of thermally conductive grease, thermally conductive epoxy-based adhesive, a thermally conductive silicon pad, a thermally conductive adhesive tape, and a graphite sheet.

14. The battery module assembly of claim 11, wherein the lower plate comprises a coolant inlet and a coolant output that protrude normal to the lower plate and to an outer side of the first space at one end or opposite ends thereof corresponding to the end plate.

15. The battery module assembly of claim 11, wherein in the battery module assembly, a coolant flowing inside the lower plate receives heat from the lower plate and discharges heat to the outside of the lower plate while heat generated from each unit module is transmitted to the lower plate such that heat dissipation of the unit modules is carried out.

16. The battery module assembly of claim 2, wherein the end plate further comprises a thermally conductive pad provided at an inner side that faces the side surface of the module array body to promote heat dissipation of the module array body, and the end plate supports the side surface while the thermally conductive pad is closely attached to the side surface of the module assembly body.

17. The battery module assembly of claim 16, wherein in the end plate, at least one opening extends through the end plate to expose the thermally conductive pad to promote heat dissipation of the module array body.

18. The battery module assembly of claim 2, wherein the battery module assembly further comprises a cover member that surrounds a top side of the module battery body while being mounted in the module housing.

19. The battery module assembly of claim 18, wherein opposite ends of the cover member, corresponding to the end plates, are perpendicularly bent so as to be closely attached to a part of external surfaces of the end plates of the module housing.

20. The battery module assembly of claim 19, wherein the cover member is mechanically combined to the end plates while the bent portions are closely attached to the external surfaces of the end plates.

21. The battery module assembly of claim 19, wherein input and output terminals are provided on a side that faces the side surrounding the top side of the module array body so as to be electrically connected with a device or another battery module assembly.

22. The battery module assembly of claim 6, wherein the combination portion of the fixing bracket is combined to the base plate together with the engaging portions while being overlapped with the engaging portions of the end plates.

23. The battery module assembly of claim 22, wherein the combination portion is combined to the base plate while being disposed on the engaging portions.

24. The battery module assembly of claim 22, wherein the engaging portions are combined to the base plate while being disposed on the combination portion.

25. The battery module assembly of claim 22, wherein the combination has a structure in which screws or rivets are inserted into openings that are punched in at least two of the engaging portions, the combination portion, and the base plate while the openings are disposed to be connection with each other.

26. A battery pack comprising at least one battery module assembly of claim 1, the battery pack comprising:

a pack housing having a mounting portion having an inwardly concave shape such that the battery module assembly is received in the mounting portion; and a cooling system that cools the battery module assembly by supplying a liquid coolant to the lower plate of the battery module assembly.

27. A device comprising the battery pack of claim 26.

28. The battery module assembly of claim 1, wherein the lower plate has a pair of short sides and a pair of long sides, and wherein the pair of end plates extend along the short sides, and wherein a length of each end plate is greater than a length of a corresponding short side of the lower plate.

* * * * *